United States Patent
Knapp et al.

(10) Patent No.: US 12,011,986 B2
(45) Date of Patent: Jun. 18, 2024

(54) WORK MACHINE

(71) Applicant: Liebherr-Werk Bischofshofen GmbH, Bischofshofen (AT)

(72) Inventors: Hans Knapp, Bischofshofen (AT); Hendrik Richter, Salzburg (AT); Christoph Kiegerl, Werfenweng (AT); Reinhard Windhofer, Mühlbach am Hochkönig (AT); Johannes Hofbauer, Eugendorf (AT)

(73) Assignee: LIEBHERR-WERK BISCHOFSHOFEN GMBH, Bischofshofen (AT)

( * ) Notice: Subject to any disclaimer, the term of this patent is extended or adjusted under 35 U.S.C. 154(b) by 0 days.

(21) Appl. No.: 17/889,659

(22) Filed: Aug. 17, 2022

(65) Prior Publication Data
US 2023/0059952 A1  Feb. 23, 2023

(30) Foreign Application Priority Data

Aug. 18, 2021 (DE) ...................... 10 2021 121 455.6
Sep. 3, 2021 (DE) ...................... 10 2021 122 820.4

(51) Int. Cl.
*B60K 11/02* (2006.01)
*B60L 1/00* (2006.01)
(Continued)

(52) U.S. Cl.
CPC .............. *B60K 11/02* (2013.01); *B60L 1/003* (2013.01); *E02F 9/0866* (2013.01); *H02K 9/193* (2013.01); *H02K 9/26* (2013.01); *F16H 57/04* (2013.01)

(58) Field of Classification Search
CPC .............. B60K 11/02; B60K 2011/006; B60K 2011/003; F16H 57/04; E02F 9/0866; H02K 9/26; H02K 9/193
See application file for complete search history.

(56) References Cited

U.S. PATENT DOCUMENTS

2002/0035973 A1* 3/2002 Takahashi ................ B60K 6/26
903/952
2007/0036663 A1* 2/2007 Welschof ................ B60K 6/46
417/364
(Continued)

FOREIGN PATENT DOCUMENTS

DE  102008034175 A1 *  1/2010  ............. H02K 11/33
DE  102012112377 A1 *  6/2014  ......... F16H 57/0409
(Continued)

OTHER PUBLICATIONS

Lehner et al., Electrical drive axle i.e. two-motor axle, for mobile working machine i.e. industrial lorry, has liquid circuit whose components are attached in drive axle, Jun. 18, 2014, EPO, DE 10 2012 112 377 A1, Machine Translation of Description (Year: 2014).*

(Continued)

*Primary Examiner* — James A English
(74) *Attorney, Agent, or Firm* — Jacobson Holman PLLC

(57) ABSTRACT

The present invention relates to a work machine, in particular a wheeled loader, having an electric motor and having oil cooling that is suitable and intended to cool the electric motor and having a driving axle that has an oil reservoir, wherein a feed line from said oil reservoir to the electric motor and a discharge line from the electric motor to said oil reservoir are present and a pump is present to pump oil from the oil reservoir to the electric motor so that the electric motor is cooled by means of oil from the oil reservoir of the driving axle.

10 Claims, 1 Drawing Sheet

(51) Int. Cl.
*E02F 9/08* (2006.01)
*H02K 9/193* (2006.01)
*H02K 9/26* (2006.01)
*F16H 57/04* (2010.01)

(56) References Cited

U.S. PATENT DOCUMENTS

| | | | | |
|---|---|---|---|---|
| 2007/0048150 | A1* | 3/2007 | Welschof | B60K 7/0007 |
| | | | | 417/410.1 |
| 2014/0097060 | A1* | 4/2014 | Hoshinoya | B60K 6/48 |
| | | | | 192/85.61 |
| 2020/0177049 | A1* | 6/2020 | Raya | H02K 3/24 |

FOREIGN PATENT DOCUMENTS

| | | | |
|---|---|---|---|
| DE | 102014018128 A1 * | 6/2016 | |
| DE | 102018211360 A1 * | 1/2020 | ......... F16H 57/0441 |

OTHER PUBLICATIONS

Bergmann et al., Electrohydraulic drive arrangement for driving e.g. working hydraulics system of ground conveyor, has ventilation device and exchanger connected to construction unit, Jan. 28, 2010, EPO, DE 10 2008 034 175 A1, Machine Translation of Description (Year: 2010).*

Ivo Greiter, Lubricant Supply System for a Drive Apparatus of an Electrically Operated Vehicle, Jan. 16, 2020, EPO, DE 10 2018 211 360 A1, Machine Translation of Description (Year: 2020).*

Brandenburg et al., Lubricant and/or coolant system, Jun. 9, 2016, EPO, DE 10 2014 018 128 A1, Machine Translation of Description (Year: 2016).*

* cited by examiner

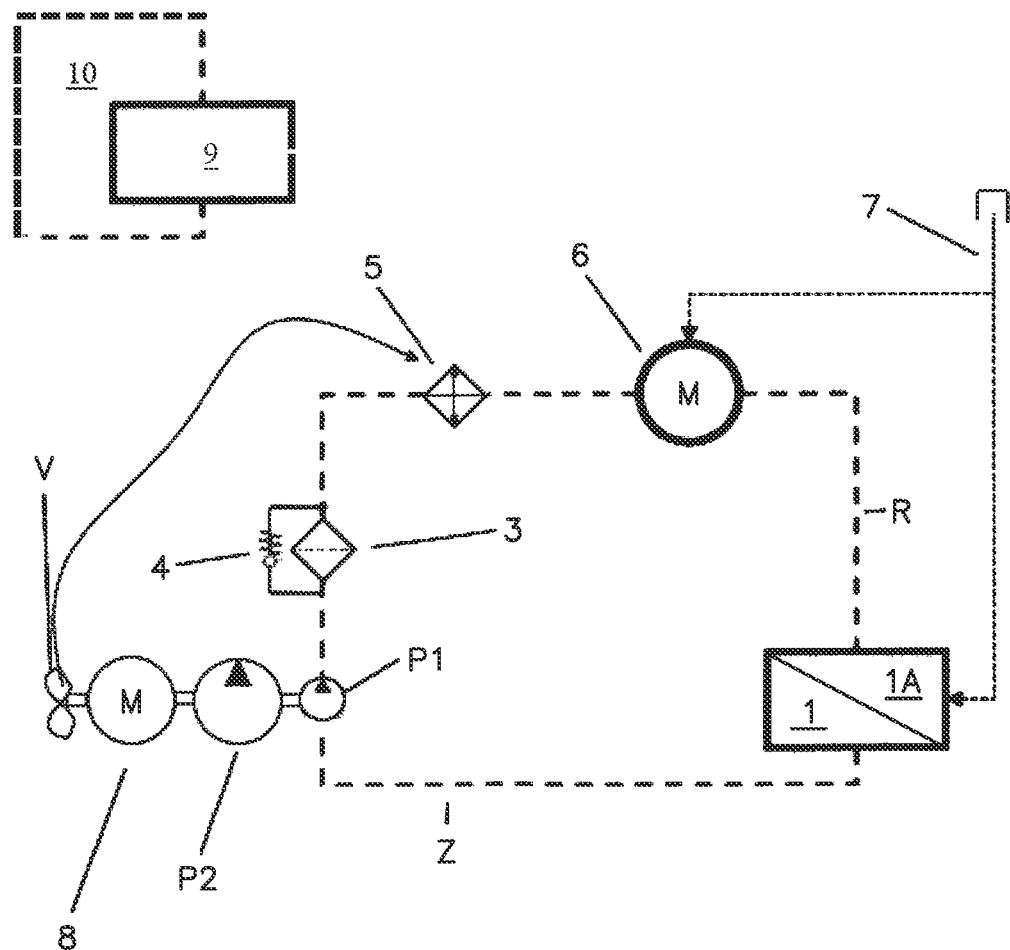

WORK MACHINE

The present invention relates to a work machine, in particular to a wheeled loader, having an electric motor and having oil cooling that is suitable and intended to cool the electric motor and having a driving axle that has an oil reservoir.

The work machine is preferably an electrically driven vehicle, that is a mobile work machine that is also or exclusively driven by means of an electric motor. This also includes purely electric vehicles and hybrid vehicles that have a further drive such as an internal combustion engine in addition to the electric motor.

It is known from the prior art to cool electric motors having a great power requirement by means of a fluid, in particular by oil, since air cooling is frequently not sufficient. The oil cooling is typically achieved by means of an additional cooling circuit including an oil reservoir, a pump, a filter, and a motor to drive the pump.

It is the underlying object of the present invention to further develop a work machine of the initially named kind such that it has a design that is as simple as possible.

This object is achieved by a work machine, in particular a wheeled loader, having an electric motor and having oil cooling that is suitable and intended to cool the electric motor and having a driving axle that has an oil reservoir, characterized in that a feed line from said oil reservoir to the electric motor and a discharge line from the electric motor to said oil reservoir are present and a pump is present to pump oil from the oil reservoir to the electric motor so that the electric motor is cooled by means of oil from the oil reservoir of the driving axle.

Provision is accordingly made that a feed line is present from said oil reservoir to the electric motor and a discharge line is present from the electric motor to said oil reservoir and a pump is present to pump oil from the oil reservoir to the electric motor so that the electric motor is cooled by means of oil from the oil reservoir of the driving axle.

BRIEF DESCRIPTION OF THE DRAWING

FIG. 1 is a schematic view of a cooling circuit for cooling the electric motor of a wheeled loader in accordance with the invention.

Within the framework of the present invention, a driving axle is understood as an axle at which the wheels or the like for the locomotion of the work machine are arranged.

The present invention is thus based on the idea of not supplying or cooling the electric motor by its own oil supply, but rather to use the axle oil that is anyway present.

A cooling system, including its own oil tank, separately intended for the electric motor can thus be dispensed with, which results in a corresponding simplification in design. The oil reservoir for cooling the electric motor is formed in accordance with the invention by the oil reservoir of the driving axle. The driving axle can, for example, be the front or rear axle of the work machine.

Oil is conducted from the driving axle or from the oil tank of the driving axle to the electric motor by means of the feed line. Oil is conducted back from the electric motor to the driving axle or to the oil tank of the driving axle by means of the return line.

The pump is preferably arranged in the feed line or in the discharge line to convey the oil from and to the electric motor so that the electric motor is located on the pressure side or suction side of the pump.

In a further embodiment of the invention, a filter for oil filtering is arranged in the feed line and in the discharge line and is preferably provided with a bypass line with a valve.

A heat exchanger can furthermore be arranged in the feed line or in the discharge line. It serves the cooling of the oil before it enters into the electric motor.

In a further development of the invention, a separate pump drive having a motor cooling in the form of a fan can be present, with the heat exchanger being arranged such that it is located in the airflow of the fan.

A heat exchanger is thus preferably provided for cooling the oil that is preferably located in the airflow of the cooling of a separate electrically driven pump drive. This separate pump can serve the supply of hydraulic consumers of the work machine.

In a further embodiment of the invention, a venting line to the atmosphere is provided for a pressure equalization between the driving axle and the electric motor.

In a preferred embodiment of the invention, the electric motor is the drive motor of the work machine. The work machine is thus preferably a work machine that is only or also driven by the electric motor.

It is also conceivable that the electric motor serves the drive of a work tool or of another hydraulic unit of the work machine.

In a further embodiment of the invention, as shown in the accompanying FIG., the work machine has a transmission 9 having an oil circuit 10, with this oil circuit not being connected to the oil cooling of the electric motor, i.e. this transmission oil circuit is preferably not used for the cooling of the electric motor.

It is particularly preferred if no further cooling circuit or no other cooling device for cooling the electric motor is present except for the cooling of the electric motor by means of the oil from the oil reservoir of the driving axle. In this case, the cooling of the electric motor takes place exclusively by means of oil that comes from the driving axle or the oil reservoir of the driving axle.

It is pointed out at this point that the terms "a" and "one" do not necessarily refer to exactly one of the elements, even though this represents a possible embodiment, but can also designate a plurality of elements. The use of the plural equally also includes the presence of the element in question in the singular and, conversely, the singular also includes a plurality of the elements in question.

Further details and advantages of the invention will be explained in more detail with reference to an embodiment shown in the drawing.

The only FIGURE shows a schematic view of a cooling circuit for cooling the electric motor of a wheeled loader or of another work machine, preferably a mobile work machine.

The driving axle of the work machine or the oil reservoir associated with the driving axle is marked by reference numeral 1 or 1A, respectively.

The feed line Z extends therefrom up to the electric motor 6 that is to be cooled.

The return line R extends from the electric motor 6 back to the driving axle or its oil reservoir.

There is thus a cooling circuit for the electric motor 6 that does not, however, have any oil reservoir separately assigned to the electric motor 6, but rather uses the oil reservoir of the driving axle 1.

The pump P1 for conveying the oil through the cooling circuit is located in the feed line Z.

This pump P1 sucks a small portion of the oil from the differential casing and conveys it to the electric motor 6.

This pump P1 and a further separate pump P2 that serves the supply of hydraulic consumers of the work machine are driven by the common motor 8.

The motor 8 has an air cooling in the form of a fan V.

The filter 3 is located downstream of the pump P1 in the feed line Z.

As can further be seen from the FIGURE, a bypass line extends around the filter 3 and has a spring-loaded valve 4 that opens at a sufficient pressure, i.e. on an exceeding of a pressure limit value only in the direction of flow, i.e. from the pump P1 toward the electric motor 6, but no in the opposite direction.

The heat exchanger 5 for cooling the oil flowing to the electric motor 6 is located further downstream.

The cooling takes place by means of the fan V.

The electric motor 6 that, for example, forms the travel drive of the wheeled loader or of another work machine is arranged downstream of the heat exchanger 5.

The return line R extends from the electric motor 6 back to the driving axle or to its oil reservoir so that a closed oil circuit or cooling circuit is present with respect to the oil cooling of the electric motor 6.

Unlike the known embodiments, this cooling circuit, however, does not have a separate oil reservoir that only serves the cooling of the electric motor 6. The anyway present oil reservoir of the driving axle 1 rather serves as the oil reservoir for cooling the electric motor 6.

The design of the cooling of the electric motor is thus correspondingly simplified with respect to known embodiments.

The driving axle is vented to the atmosphere together with the motor via the line 7 to equalize the pressure level between the driving axle 1 and the electric motor 6.

Preferred aspects of the invention will be described in the following:

- Mobile work machines with an oil-cooled electric motor in which the axle oil supply is used for the electric motor cooling with the advantage that a separate cost-driving oil tank can be dispensed with and the frequently sensitive oil supply of a transmission can remain untouched.
- Cooling circuit circulating pump(s) for the cooling of driving motor(s) and pump motor(s), with one or more circulating pumps being co-driven by the at least one pump drive of the hydraulic consumers that are independent of the travel drive.
- Cooling circuit circulation pump(s) with a constant or variable displacement volume.
- Cooling circuit with a common circulating pump for the common supply of a plurality of drives.
- Cooling circuit with a separate cooling circuit circulation pump for every electric drive, in particular drive motor(s) and pump motor(s).
- Use of a heat exchanger that is preferably in the airflow of the fan of the separate electrically driven pump drive.
- Use of an oil filter.
- A bypass valve is provided to protect the electric motor from contaminated filters.
- Use of the existing oil outlet and refill screws of the driving axle for cooling oil suction and coiling oil return of the electric motor cooling.
- Venting the driving axle via the venting of the motor.

The invention claimed is:

1. A work machine having an electric motor and having oil cooling that is suitable and intended to cool the electric motor and having a driving axle that has an oil reservoir, characterized in that a feed line from said oil reservoir to the electric motor and a discharge line from the electric motor to said oil reservoir are present and a pump is present to pump oil from the oil reservoir to the electric motor so that the electric motor is cooled by means of oil from the oil reservoir of the driving axle, and characterized in that the work machine has a transmission having an oil circuit, wherein the oil circuit is not connected to the oil cooling of the electric motor.

2. A work machine in accordance with claim 1, characterized in that the pump is arranged in the feed line or in the discharge line.

3. A work machine in accordance with claim 1, characterized in that a filter is arranged in the feed line or in the discharge line.

4. A work machine in accordance with claim 1, characterized in that a heat exchanger is arranged in the feed line or in the discharge line.

5. A work machine in accordance with claim 4, characterized in that a separate pump drive having a motor cooling in the form of a fan is present; and in that the heat exchanger is located in the airflow of the fan.

6. A work machine in accordance with claim 1, characterized in that a venting line to the atmosphere is present for a pressure equalization between the driving axle and the electric motor.

7. A work machine in accordance with claim 1, characterized in that the electric motor forms the drive motor of the work machine.

8. A work machine in accordance with claim 1, characterized in that the electric motor serves the drive of a work tool or of another hydraulic unit of the work machine.

9. A work machine in accordance with claim 1, characterized in that no further cooling circuit or no other cooling device for cooling the electric motor is present except for the cooling of the electric motor by means of the oil from the oil reservoir.

10. A work machine in accordance with claim 1, characterized in that a filter is arranged in the feed line or in the discharge line and is provided with a bypass line with a valve.

* * * * *